Patented Nov. 12, 1929

1,735,096

UNITED STATES PATENT OFFICE

EDOUARD URBAIN, OF PARIS, FRANCE, ASSIGNOR TO URBAIN CORPORATION, A CORPORATION OF DELAWARE

MANUFACTURE OF ACTIVE CARBONS

No Drawing. Application filed April 24, 1925, Serial No. 25,707, and in France December 24, 1924.

My studies have shown me that in order to produce a highly active carbon it is necessary to fulfill the following conditions:

First: The hydrogen content must be reduced to the minimum attainable;

Second: The compactness must be suitable for the ultimate purposes for which the carbon is to be used; the compactness of a carbon granule being the ratio of the volume actually occupied by the solid carbon in that granule to the total apparent volume of the granule (i. e. the volume of the solid plus the volume of the pores). The compactness may vary over wide limits. For example, when absorbing light gases I have used a carbon having a compactness of .5; whereas for certain vapours, better results have been obtained with a carbon having a compactness of .25. Under extreme conditions even a wider range may be desirable, and it is important that the manufacturer be able to control the compactness of the finished product without unduly sacrificing the beneficial qualities arising from a minimum hydrogen content.

When a vegetable material is calcined under usual conditions, there remains after calcination a considerable quantity of hydrogen; however, by prolonging the calcination and by considerably raising the temperature, and in certain cases by heating under vacuum, it is possible to eliminate the hydrogen, but such operations are not industrially economic and further the compactness of the carbon thus obtained is generally insufficient for industrial purposes.

Oxidation by air, water vapour or combustion gases, was conceived by Ostrejko to be capable of effecting good results, and to a certain extent, does accomplish the desired purpose, as the water vapour acts on the residual hydrocarbons and destroys them, forming carbon monoxide and hydrogen. Unfortunately, water vapour or the other gases above mentioned act also during the operation to a large extent on the carbon, causing a great loss of carbon. That is why, with this process it is difficult to obtain a sufficiently compact material sufficiently deprived of hydrogen, even if one utilizes only those vegetable materials, which give a very dense compact charcoal.

One phase of my invention is based upon the discovery that carbon can be produced, which is substantially free from hydrogen, and at the same time with sufficient compactness for the purposes desired, if material such as peat, lignite, ground corozo nuts or the like is permeated with a liquid which is adapted at relatively high temperatures to act rapidly to break down hydrogen containing compounds, and which has relatively little effect on the body of the carbon in the course of the operation, and then, preferably after drying, is heated in a retort or similar apparatus to such temperatures. The temperature may vary with different reagents. Many different substances will serve this purpose with varying efficiency such as the metallic chlorides, of which zinc chloride may serve as an illustration, or a relatively non-volatile acid such as phosphoric acid.

In the course of my studies I have found that the action of zinc chloride on vegetable materials may be divided into 2 phases:

1. A dehydrating action which brings the hydrogen content down, say, in the case of peat, to about 2%.

2. A hydrolysis of zinc chloride which gives rise to hydrochloric acid with the formation of zinc oxide (ZnO). It is this oxide of zinc which furnishes the oxygen to decompose the residual hydrocarbons left after the first reaction of the zinc chloride.

The dehydrating action of that reagent, is advantages in avoiding a loss of the carbon contained in the volatile matters, this carbon being precipitated. While the latter may initially be deposited in a form which still contains hydrogen, the subsequent treatment will substantially eliminate the hydrogen and the carbon of the volatile matters thus precipitated will aid to build up the body of the active material.

As the decomposition of the zinc chloride, in the manner in which I utilize it, gives rise to highly corrosive gases, I prefer generally for the preparation of active carbons to use a mixture of sulphuric acid and phosphoric acid.

In general, in carrying out my process, I utilize finely ground vegetable substances or a substance from any other suitable source, such as decorticated ivory nuts, peat, lignite, cellulose, wood or the like, or a mixture of two or more of such substances. The exact amount of each of the acids to be used will vary somewhat depending on the material used and the type of carbon to be produced, and this can be determined by a preliminary test. Roughly, it may be suggested that 1 part of sulphuric acid (66° Bé.) is mixed with 2 parts of concentrated phosphoric acid and one part of this mixture is used with three parts of the raw material. Additional water is then added so that the mass can be worked into a paste. Upon the consistency of this paste will depend, in part, the ultimate physical qualities of the carbon, for the less water that is used, the denser will be the final product, and it is an important feature of my process that the ultimate compactness can thus be controlled.

The paste thus prepared, is pressed into the form desired for the carbon, and here again the final compactness can be modified by the amount of pressure used. A simple way of molding the material is by extruding it through a perforated plate. The resulting strings may readily be broken into pieces of any desired length, which are then dried at about 300° C.

During the drying operation, the sulphuric acid dehydrates the organic matters and the product thus dried is in a geometrical form and contains, in the case of peat, about 2% hydrogen calculated on the carbon content.

The dehydration obtained by the sulphuric acid is such that there is practically no evolution of carbonaceous volatile matters, and consequently that there is in that first phase of the operation practically no loss of carbon.

After this first treatment the product is charged into horizontal retorts of the ordinary gas works type or any other type of closed calcining vessel, which permits the escape of gases. Under the action of heat the phosphoric acid is dehydrated and goes over into metaphosphoric acid, and when the temperature reaches about 800° C., there is evolved $PH^3$, and then later $P^2H^4$, and finally phosphorus $P^2$.

Since the phosphoric acid had thoroughly permeated the raw material, the rapid reactions incident to the decomposition of the phosphoric acid may explain the removal of the hydrogen with relatively small carbon losses, and I find that following this procedure I can readily produce carbons of a predetermined compactness which may be established within wide limits (for example between .7 and .15), which carbons will be substantially free from hydrogen. As a matter of fact carbons made in this manner covering the above range of compactness will ordinarily contain substantially less than .3% hydrogen, and it is readily possible to reduce the hydrogen content below .1%.

I find it advantageous to recover the phosphoric acid, and in order to do that I have used retorts which are connected at one end to a combustion chamber in which the evolved products above mentioned are burnt, with the formation of phosphoric anhydrid. The latter is dissolved in water and the phosphoric acid is thus regenerated.

It may be well to remark that the basic mineral matters, which may be contained in the vegetable products, are transformed into tribasic phosphates, and, consequently, the carbon obtained by the process described, will be absolutely harmless; and can, therefore, be utilized for the treatment of food products.

Besides, it is well to note that if an excess of phosphoric acid has not been used, the carbon after calcining will not need washing. The geometrical shape of the carbon is also a feature of value, as it permits of an efficient utilization of the apparatus employed.

When a solution of a metallic chloride, such as zinc chloride, is used in accordance with my process, the procedure may in general follow the outline already given (except that after calcination it is advisable to wash the carbon with hydrochloric acid and recalcine) and the hydrochloric acid evolved during the calcination may be recuperated by washing.

In certain cases I may use a mixture of hydrochloric acid and zinc chloride, generally known as the Cross and Bevan reagent, or a mixture of phosphoric acid and hydrochloric acid.

By heating and digesting the raw material used, a good plastic mass suitable for agglomeration may thus be obtained even with coarsely ground substances or with raw materials, which may not, otherwise be easily agglomerated.

When these reagents are used the compactness of the product, as before, may be varied by modifying the consistency of the plastic mass or by modifying the pressure used in the molding operation. Further, under these particular circumstances, the compactness of the finished product may be varied by making the digestion of the raw material more or less complete, for this will allow more or less of the hydrolyzable matter contained in the raw material to be rendered soluble and extracted by the reagents used.

Also when using the reagents above mentioned, the compactness of the finished product may be varied without having recourse to agglomeration, for if one starts with a suitable raw material broken into small pieces, the compactness may be varied directly by controlling the degree of dissolution.

The raw material (ivory nuts for example) is broken into small pieces—say of sufficiently small size to pass through a quarter-inch mesh screen—and then is heated in the solution referred to. A certain amount of the hydrolyzable material is dissolved out and the compactness of the product is, in this case, controlled simply by the amount of dissolution that goes on, which will of course depend on the time of treatment, the concentration of the bath and the temperature used.

After the raw material has been digested to a sufficient extent, which with ivory nuts may be shortly after the pieces have become translucent, the solution is drained off or extracted in any desired manner. The pieces are dried, and then calcined as already described, and if necessary washed with an acid and then finally dried or recalcined.

It is to be noted that according to each method which I have described, I control the degree of compactness of the final product prior to the operations during which the hydrogen is removed. As I have pointed out, it is of great importance that these two phases of the problem be separately controlled, for the hydrogen content should be brought down as much as possible and at the same time carbons of different degrees of compactness should be available, if one wishes to operate at maximum efficiency for different purposes. In general for the absorption of light molecules a very compact carbon is desirable, whereas a much less compact carbon will be more efficient for heavy molecules.

As already stated, a certain amount of the hydrolyzable substances contained in the raw material are dissolved in the liquid used in the course of the above described treatments.

I have discovered that a very good grade of active carbon with a very high decolorizing power can be produced as a by-product, by evaporating down to dryness the solution which is drawn off after digestion of the raw material, and by continuing the heating of the dry residue until carbonizing of the dissolved substances has taken place.

This carbonized product may then be washed if desired and a second calcination may sometimes be necessary in order to obtain very high class carbon.

The active carbon thus obtained will generally be used in a pulverulent form, with the required degree of fineness, but I have also found that granulated material for decolorizing or other purposes may be produced by dipping solid porous supports for example pieces of coke or other suitable material into the solution above referred to, prior to the evaporation and subsequent treatment.

It is to be understood that the term "carbon" is mostly used in the course of this specification as a usual technical term and is not intended to designate the chemical element.

It is also to be understood that the details which I have described in the course of this specification are intended to be illustrative only and are not intended to limit the invention.

Certain matters originally claimed in this case are now claimed in my co-pending application, Ser. No. 98,376, filed March 29, 1926.

What I claim is:

1. The process of producing active carbon which comprises permeating vegetable material or the like with a mixture of phosphoric acid and sulphuric acid, heating and calcining in a substantially closed vessel allowing the escape of gases at a temperature high enough to cause the phosphoric acid to decompose with the formation of phosphides.

2. In the process as defined in claim 1, in which the heating is continued until the evolution of phosphorus containing ingredients substantially ceases.

3. In the process of producing active carbon, a method of controlling the compactness of the finished product, which involves the steps of treating masses of vegetable material or the like with a dehydrating agent adapted to dissolve out a portion thereof, removing the dissolved material, and thereafter carbonizing the remainder in the presence of a residue of said dehydrating agent.

4. As a new product, active carbon comprising a carbonized reaction product of vegetable carbonaceous material and phosphoric acid, which product is substantially free from ingredients adapted to cause an evolution of phosphorus hydrogen compounds when said product is heated substantially above 800° C.

5. As a new product, active carbon comprising reaction products of cellulosic material heated to at least 800° C. in the presence of a reagent of acid reaction comprising oxygen and phosphorus in chemical combination, which product comprises less than .3% of hydrogen.

6. The process of producing active carbon of predetermined density which comprises the steps of forming a compact mass of cellulosic material and a predetermined quantity of added liquid ingredients at least a portion of which demands a temperature of 800° C. to be distilled off, and thereafter calcining such mass in a closed retort permitting the escape of gases, at a temperature of at least 800° C.

7. A method of producing active carbon of predetermined density which comprises the steps of forming a compact mass of cellulosic material and a liquid having ingredients adapted to distil off at various degrees of temperature, distilling off a portion of the liquid below the temperature at which the carbon in the cellulosic material will combine with oxygen, and distilling off an additional portion of the ingredients of such liquid at a temperature of at least 800° C. but in a retort which permits the escape of gases but does not permit inflow of oxygen containing gases, whereby combustion of carbon is maintained at a minimum.

In testimony whereof I hereunto affix my signature.

EDOUARD URBAIN.